Patented Dec. 9, 1924.

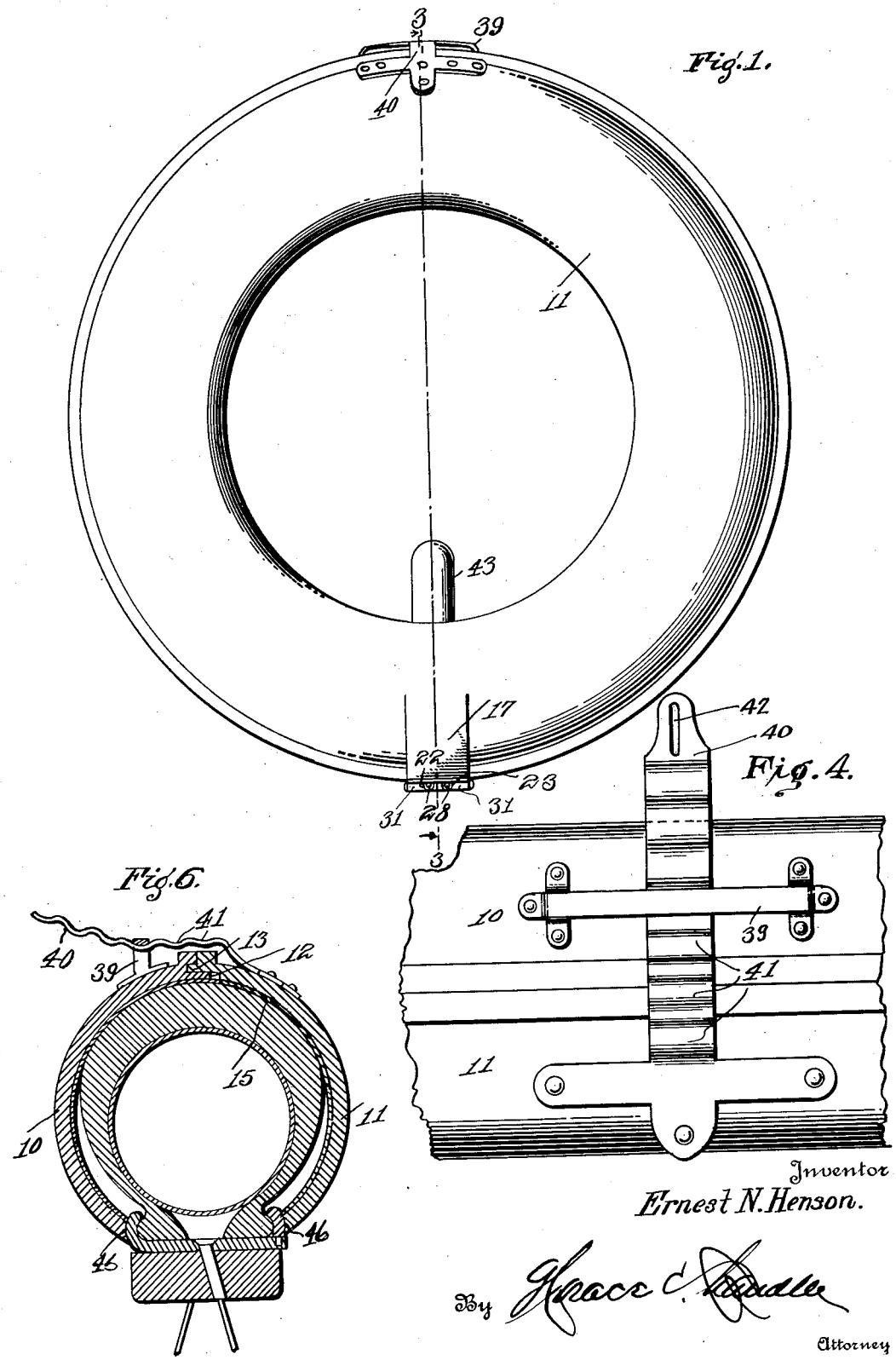

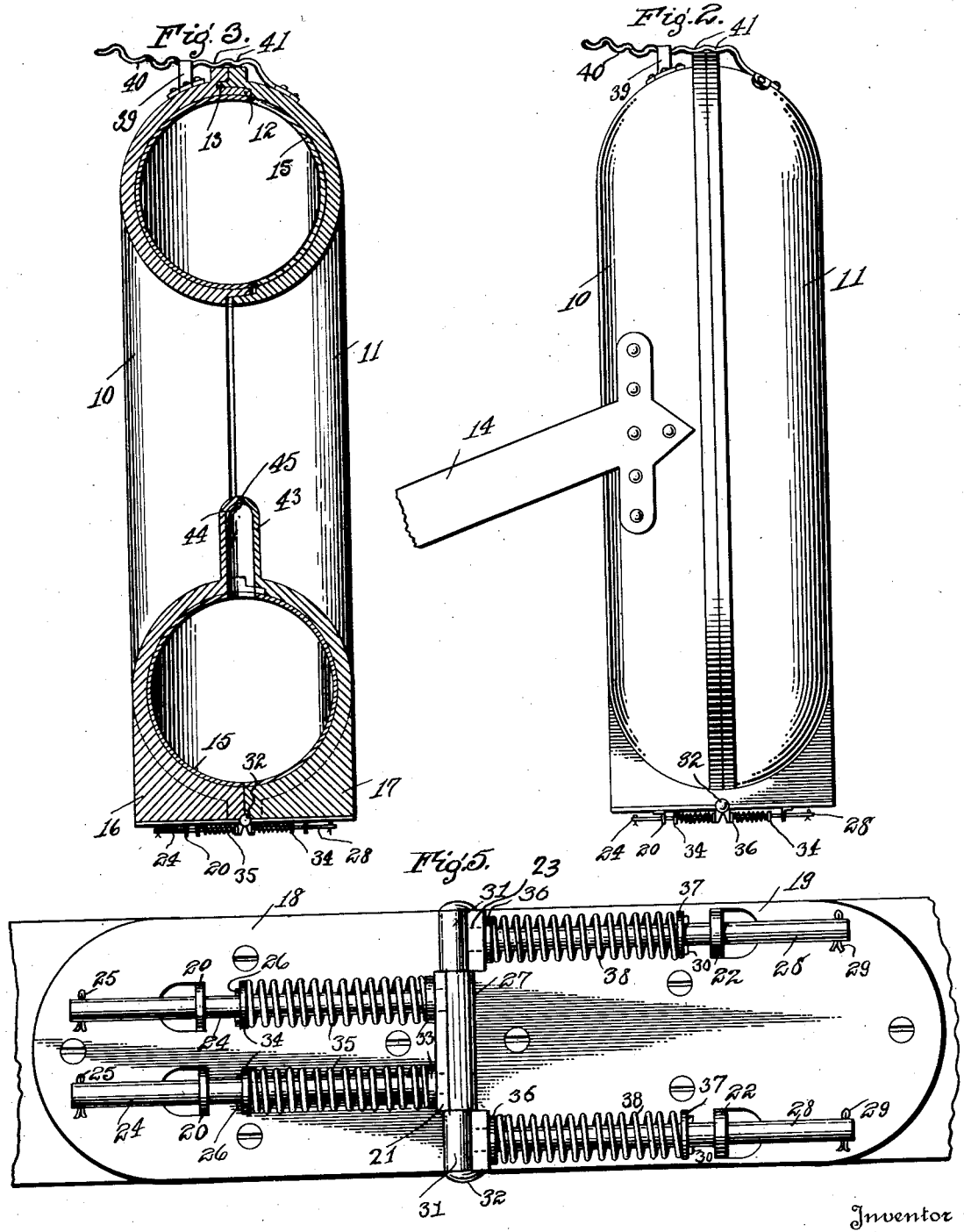

1,518,923

UNITED STATES PATENT OFFICE.

ERNEST N. HENSON, OF MEMPHIS, TEXAS, ASSIGNOR OF ONE-HALF TO CHARLES LEE RUSHING, OF MEMPHIS, TEXAS.

SPARE-TIRE HOLDER.

Application filed July 23, 1923. Serial No. 653,250.

*To all whom it may concern:*

Be it known that I, ERNEST N. HENSON, a citizen of the United States, residing at Memphis, in the county of Hall, State of Texas, have invented certain new and useful Improvements in Spare-Tire Holders; and I do hereby declare the following to be a full, clear, and exact description of the invention, such as will enable others skilled in the art to which it appertains to make and use the same.

This invention relates to new and useful improvements in tire holders and particularly to tire holders for spare tires, mounted on the side or rear of automobiles.

One object of the invention is to provide a device of this character wherein a tire will be protected from theft, and also from deterioration by moisture.

Another object of the invention is to provide a holder of this character which is automatically adjustable to receive tires which are over-sized, and at the same time afford the same protection thereto, as is afforded the regular sized tire, and to expand with the tire due to heat.

Another object is to provide a novel hinge for the sections of the holder which will expand to permit the proper holding of the larger tire, together with a novel and improved means for holding and locking the closure portion of the holder in different closed positions.

Other objects and advantages will be apparent from the following description when taken in connection with the accompanying drawing.

In the drawing:

Figure 1 is an elevation of the tire holder.

Figure 2 is a side elevation of the same.

Figure 3 is a vertical sectional detail view taken centrally on the line 3—3 of Figure 1.

Figure 4 is a top plan view of the locking device.

Figure 5 is a bottom plan view showing the hinge.

Figure 6 is a fragmentary section showing the use of the device with a wire wheel or disk wheel.

Referring particularly to the accompanying drawing, the holder includes the sections 10 and 11, which, when in closed position, combine to form a casing in the form of a torus. The peripheral edge of the section 10, is offset outwardly, as shown at 12, while the peripheral edge of the section 11 is offset inwardly, as shown at 13, the latter offset, however, being slightly longer than the former offset, and being arranged to fit within the former, to close the space between the peripheral edges of the two sections, when said sections are in tire enclosing position. The section 10 has secured thereto the arms 14, which are arranged to be secured to the back of an automobile, in any suitable manner. The interior of each of the sections 10 and 11 is lined with felt, to prevent chafing of the tire, as shown at 15.

The lower portions of the sections 10 and 11 are formed with the enlargements 16 and 17, respectively, which have their bottom faces flat, as clearly seen in the side elevation, Figure 2, and secured to these flat faces, respectively, are the metal plates 18 and 19. Struck from the plate 18, at opposite sides of its longitudinal center, and adjacent the outer and inner ends of the plate, are the longitudinally alined apertured lugs 20 and 21, the outer lugs 20 aligning with the openings of the inner lug 21, as seen in Figure 5. Struck from the plate 19, are lugs 22 and 23, but these lugs are arranged adjacent the side edges of the plate, the lugs 22 alining with the lugs 23. Disposed longitudinally through each lug 20 and its alined lug 21, is a rod 24, a transverse pin 25 being disposed through the end of the rod outwardly of the lug 20, while a similar pin is disposed through the rod, inwardly of the lug 20, as shown at 26. Formed integrally with the inner ends of the rods 24 is a transverse tubular member 27. Disposed through each lug 22 and its alined lug 23, is a rod 28, the same having a transverse pin 29 in its end outwardly of the lug 22, and a similar pin 30 inwardly of said lug. On the inner end of each of the rods 28 there is formed a transverse tubular member 31 which is disposed at the end of the tubular member 27, to receive the pivot pin 32 therethrough, and whereby the pivotal portion of the hinge is formed. Disposed on each of the rods 24, against the inner lug 21, and against the inner pin 26, are the washers 33 and 34, respectively, and on each rod, and bearing with its ends against these washers, is a coil spring 35. Similar washers 36 and 37 are disposed on the rods 28, against the lugs 23 and the inner pins 30, and engaged on each rod, and bearing against the said washers 36 and 37, are the coil springs 38. By this hinge construction, when the sections 10 and 11 are moved away from each other, as when an over-sized tire is placed in the holder, provision is made for such expansion to accommodate such a tire.

Secured to the upper side of the section 10, adjacent its peripheral edge, is an offset strap loop 39, beneath which is arranged to pass the outer end of the tongue or strap 40, which is fixed to the corresponding portion of the section 11. This tongue 40 is formed with a plurality of transversely extending corrugations 41, which engage with the bight portion of the loop 39 to hold the section 11 properly spaced from the section 10, when a tire of larger size is disposed within the holder. The outer end of the tongue 40 is formed with an opening 42 for the reception of the shackle of a padlock, whereby the sections 10 and 11 may be properly locked against opening.

Attention is directed to the fact that by reason of the greater length of the offset of the section 11, the space between the meeting or overlapping edges of the sections will be closed, whether a normal sized tire, or an over sized tire is within the holder. Furthermore, when a larger tire is within the holder, the section 11 will move outwardly, putting the springs 35 and 38, of the hinge, under compression.

Formed in the periphery of the central opening of the casing, and having one-half on each of the sections 10 and 11, is a small casing 43, within which the valve of the tire is disposed, the peripheral edge of each portion of this casing 43 being formed at 44, 45, in a manner identical to that of the engaging edges of the sections 10 and 11, to exclude moisture and dust.

In Figure 6 there is shown the form of the device when used in connection with a wire spoked wheel or a disk wheel. It will be noted that the engaging flanges or offset portions 12 and 13 are omitted, and the edges of the sections formed to snugly engage with the sides of the rim of the wheel, as shown at 46. This will effectively exclude dust and moisture from the tire.

What is claimed is:

1. In a tire holder the combination with a sectional casing, expansible yieldable connections between portions of the sections of the casing, and means for adjustably connecting other portions of the sections commensurate with the expansion of the expansible connections.

2. In a tire holder the combination with a casing composed of sections, an expansible and yielding means connecting the sections at one point, and means adjustably connecting the sections at a point diametrically opposite the first connections commensurate with the expansion of the expansible means.

3. In a tire holder the combination with a casing composed of semi-toric sections, an expansible spring hinge connecting the sections at one point, and a locking means at a point diametrically opposite to the hinge and including a loop carried by one section and a tongue carried by the other section and adjustably engageable with the loop commensurate with the expansion of the spring hinge.

4. In a tire holder comprising the combination with a toric casing composed of sections, and an expansible hinge connecting the portions of the sections at one point and comprising spring members pivotally connected together and slidably connected with the sections and means for locking the sections at a point diametrically opposite to the first point and adjustable commensurate with the expansion of the hinge.

In testimony whereof, I affix my signature, in the presence of two witnesses.

ERNEST N. HENSON.

Witnesses:
C. L. RUSHING,
BOB HOWELL.